United States Patent [19]
Shaw

[11] 3,842,258
[45] Oct. 15, 1974

[54] PHOTO RELAY COMPRISING LIGHT-TRANSMITTING PLATE ALSO USED AS A CIRCUIT BOARD

[75] Inventor: Raymond J. Shaw, Westboro, Mass.

[73] Assignee: MEKontrol, Inc., Northboro, Mass.

[22] Filed: June 25, 1973

[21] Appl. No.: 373,031

[52] U.S. Cl. .................. 250/209, 250/239, 317/127
[51] Int. Cl. .......................................... H01h 47/24
[58] Field of Search ............ 250/239, 209; 317/127; 340/237 S

[56] References Cited

UNITED STATES PATENTS

| | | | |
|---|---|---|---|
| 3,128,413 | 4/1964 | Person | 250/239 X |
| 3,233,111 | 2/1966 | Pike | 250/239 X |
| 3,417,392 | 12/1968 | Hansen, Sr. et al. | 340/237 S |
| 3,530,690 | 9/1970 | Nickell et al. | 250/239 X |
| 3,740,562 | 6/1973 | Fertig | 250/239 X |

*Primary Examiner*—James W. Lawrence
*Assistant Examiner*—T. N. Grigsby
*Attorney, Agent, or Firm*—Norman S. Blodgett; Gerry A. Blodgett

[57] ABSTRACT

A dark activated switch is provided with a translucent plate on which the light-sensitive resistor is mounted, thereby simplifying alignment of the optical system. It is also provided with a sensor which activates the system only after the light source has been illuminated.

3 Claims, 4 Drawing Figures

PATENTED OCT 1 5 1974

3,842,258

SHEET 2 OF 2

PHOTO RELAY COMPRISING LIGHT-TRANSMITTING PLATE ALSO USED AS A CIRCUIT BOARD

BACKGROUND OF THE INVENTION

The use of light beams in the control of material movement is a well developed art. In a typical situation, a path along which goods moved has a light source on one side and a light sensor on the other. If an opaque object passes between the source and sensor, the darkness causes the sensor to initiate some action. Several problems which are intrinsic to a two unit system, are obviated by the introduction of a one-unit system in which the light source and sensor are in the same unit. This apparatus functions by directing a light beam across the path, beyond which the beam impinges on a retro-reflective surface and is returned to the sensor in the unit. Although this design does eliminate many problems, and opens up whole new areas for control by light beams, several problems remain. A major problem involves optical alignment. In order to prevent extraneous light from reaching the sensor, an optical system is provided, which severely limits the direction from which a beam may approach the sensor. The situation demands that precise optical alignment be established and maintained. Normally, alignment and periodic checks require skilled equipment shut-down. Another problem for dark activated switches, which occurs during start-up or when the bulb of the light source burns out, is that if the source of light is not giving off illumination, the sensor acts as if an object is in the beam. Recalling that upon start-up, a solid state electronic system is nearly instantaneously active, whereas the light bulb requires a finite warm-up time, it is obvious that the system could easily initiate wasteful or dangerous action on the non-existant object. These and other difficulties experienced with the prior art devices have been obviated in a novel manner by the present invention.

It is, therefore, an outstanding object of the invention to provide a light-sensitive switch which changes condition in response to a beam of light.

Another object of this invention is the provision of a light-sensitive switch which can be optically easily 'aligned by one operator.

A further object of the present invention is the provision of a light-sensitive switch in which alignment can be checked without interrupting or disassembling the equipment.

It is another object of the instant invention to provide a light-sensitive switch which causes an event upon the interruption of a light beam, but during start-up the switch is not light sensitive until the source of light has become brilliant.

With these and other objects in view, as will be apparent to those skilled in the art, the invention resides in the combination of parts set forth in the specification and covered by the claims appended hereto.

SUMMARY OF THE INVENTION

This invention involves a switch, which is sensitive to beams of light radiating from a light source. It includes a housing, a light-sensitive element within the housing, and an opening which allows light to fall on the light-sensitive element. More specifically, this invention includes a translucent plate on which the light-sensitive element is mounted, and a second light-sensitive element which sensitizes the first light-sensitive element only when the light source is operating.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
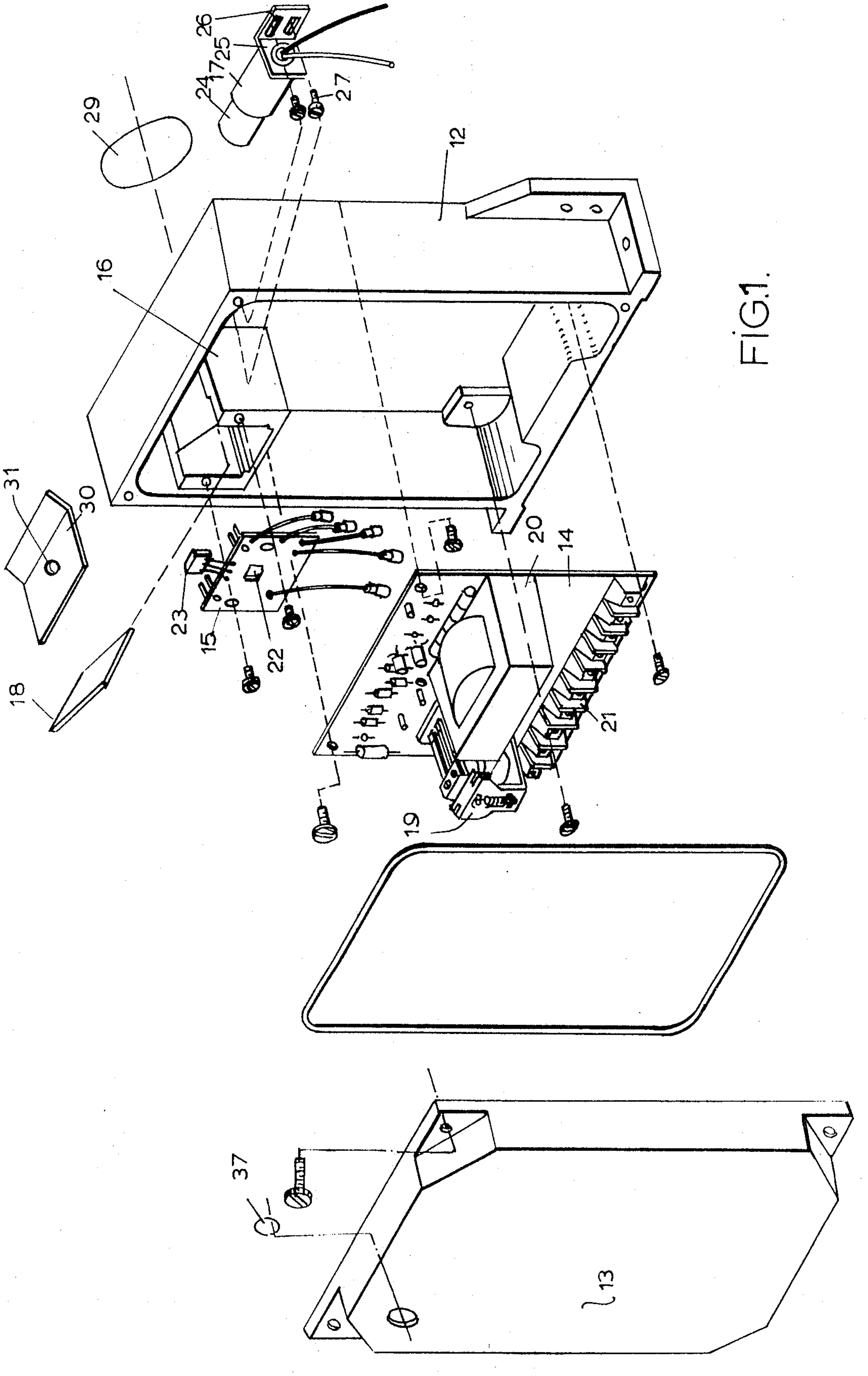
FIG. 1 shows an expanded perspective view of a switch embodying the principles of the present invention.

Referring first to FIG. 1, wherein are best shown the general features of the invention, the switch, indicated generally by reference numeral 10, is shown as having a housing 11, with a front 12 and a back 13. Within the housing, are mounted a large circuit board 14, a small translucent circuit board 15, a cell chamber 16, a light source 17 and a half-silvered mirror 18.

The large circuit board 14, carries a relay 19, a transformer 20, a junction strip 21 and most of the circuitry that will be discussed later. Small circuit board 15 carries some circuitry, photo-cell 22 on the front surface and photo-transistor 23 extending from the upper edge.

The light source 17 consists of a bulb 24 and bulb holder 25, the latter being adjustably attached to the housing front by slots 26 and screws 27.

The cell chamber 16 consists of two sides, a bottom side, and a front side, integral to the housing front 12. The front side has a front aperture 28 which carries a lens 29. The small translucent circuit board 15 makes up the back of the chamber and holds the photo-voltaic cell 22 in the chamber. The top of the chamber consists of a top plate 30 having a top aperture 31. Half-silvered mirror 18 is positioned in the chamber at a 45° angle so that all of the light from bulb 24 which passes into the chamber is directed out the front aperture 28. The reflecting characteristics of the mirror are such, that light entering the front aperture is directed to the photo-voltaic cell.

The bulb 24 is positioned over the top aperture 31 and adjacent a side aperture 33 (not shown) in the housing which allows external evidence of the operation of the bulb 24. The side aperture is provided with a filter.

Figures 2, 3, 4:
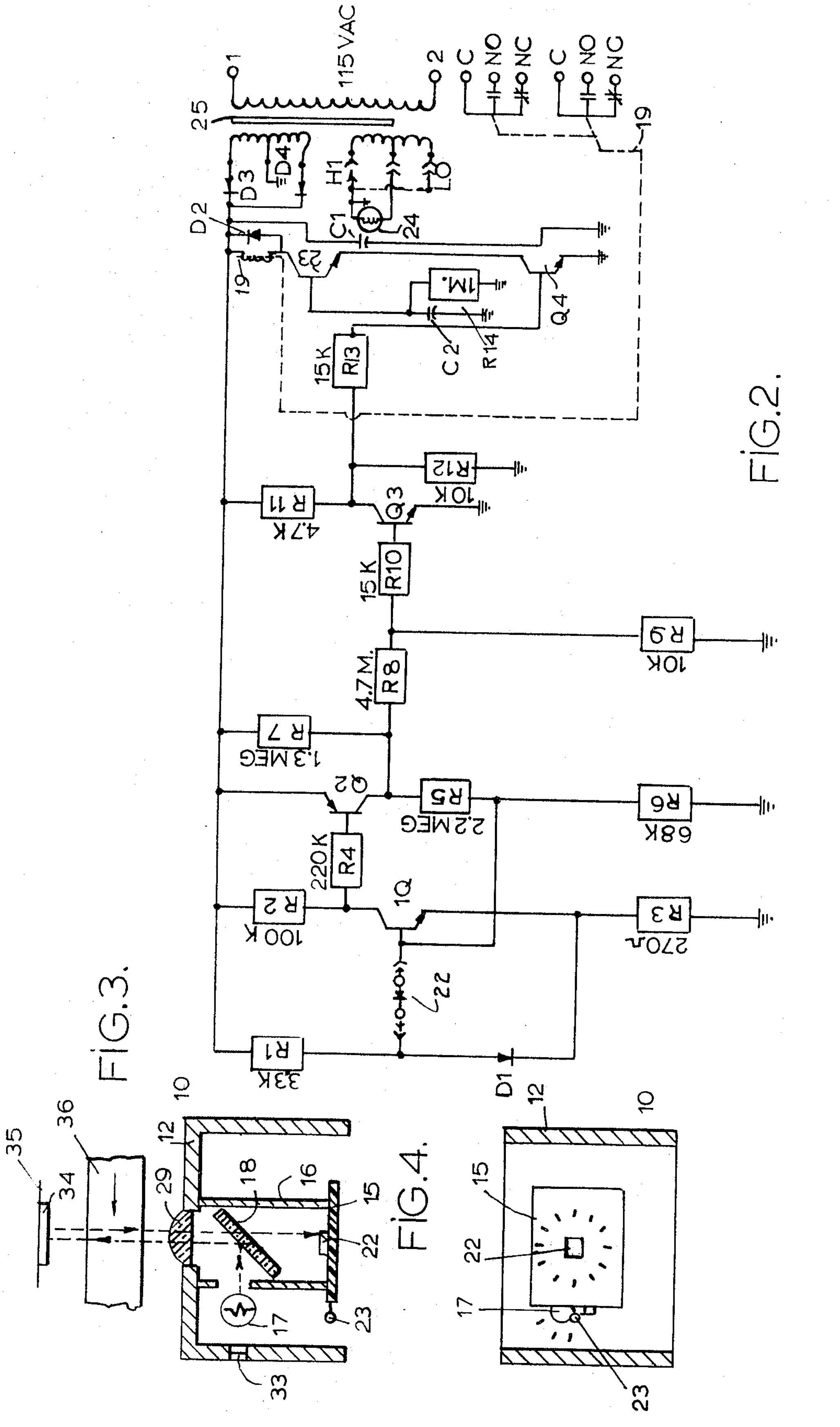
FIG. 2 shows a schematic diagram of the electronic circuit of the preferred embodiment.
FIG. 3 shows a diagrammatic plan view of the preferred embodiment.
FIG. 4 shows a diagrammatic rear elevation view of the preferred embodiment.

FIG. 2 shows a schematic diagram of the preferred circuitry of the present invention. Junctions 1–8 define transformer 20 which converts 115 VAC to power for lamp and the remaining circuit. Power for the circuit passes through a rectifier consisting of capacitor C1 and diodes D3 and D4. The series of amplification stages involving diode D1, transistors Q1 through Q4 and resistors R1 through R13, allow photo-cell 22 to control current through transistor Q4 and thus the action of the relay 19. The circuit including photo-transistor 23, resistor R14 and capacitor C2, allows current to flow through relay 19 and transistor Q4 only if the photo-transistor 23 senses that bulb 24 has achieved a certain degree of brilliance.

The use and operation of the invention will now be understood in view of the above discussion. In a possible application of the present switch, the beam could be directed across a conveyor belt. As an object moves on the conveyor belt, the object eventually interrupts the beam. The switch senses the interruption of the beam, sets a timer which stops the belt for 30 seconds and causes mechanical paint sprayers, positioned around the belt, to paint the object.

Looking to FIGS. 3 and 4 which show diagrammatic representations of the system, to install the switch of the present invention, a piece of retro-reflective material 34 is placed on a surface 35 so that it faces across the conveyor 36. The switch is then loosely positioned on the opposite side of the conveyor 36, so that the lens 29, is directed at the retro-reflective material 34. Final alignment is done with power supplied to the switch, but not to the equipment which the switch controls. The optical system is intended to be aligned at the factory for proper operation. No field adjustment should be necessary on new equipment. No lamp adjustment is required when lamp changing occurs. If the lamp becomes misaligned, it can be realigned using the following procedure:

a. Horizontal: To adjust the light spot in the horizontal position. With cover removed
   1. Turn power on.
   2. Place Reflex Target 2 to 3 feet in front of the photoelectric unit.
   3. At the rear of the optical assembly, not the bright spot on the cell-holder. If it is to the left of center of the cell-holder, loosen the lamp bracket and move bulb to the left. If the spot is to the right of center of the cell-holder, move the lamp bulb to the right.
b. Vertical: To adjust light spot in the vertical position. With cover removed, proceed with steps (1) and (2) above.
   3. If light spot is above or below the center of the cell-holder, slightly bend the socket bracket to cause the lamp filament to move forward or away from the front face to provide the desired result.

The board 15 is then replaced and an image of the bulb forms on it with the shadow of photo-cell 22 blocking some of the image. The bulb position is then adjusted so that the shadow of the photo-cell blocks the image of the bulb filament. The power to the switch is then shut-off and then put on again. The relay 19 should not react. If it does, the photo-transistor 23 is activating the system before the bulb is bright enough. To correct this situation, the photo-transistor 23 is bent back away from the bulb. This procedure is repeated until the relay does not react to on-off switching. The equipment to be controlled is, then, connected and the back 13 is attached. The switch and system are now ready to operate. During operation the bulb can be checked through side aperture 33.

When the system is given power, the electric circuit is energized immediately and the bulb 24 lights relatively slowly. Until the bulb reaches a certain brilliance, the photo-transistor does not allow photo-cell 22 and, in turn, transistor Q4, to control the relay 19. Once the bulb has become sufficiently illuminated, the circuitry causes the relay to change state whenever the beam is interrupted, and to return to its normal state when the obstruction is removed.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A switch, sensitive to beams of light from a source of light comprising:
a. a housing having an opening,
b. a light transmitting plate in the housing, the plate also being used as a circuit board,
c. a first light-sensitive element mounted on the plate, the opening in the housing allowing beams of light which approach it from a certain direction to impinge on the light-sensitive element,
d. a set of electrical contacts,
e. electrical circuitry associated with the light-sensitive element and the contacts for changing the condition of the contacts when the beam of light ceases to impinge on the light-sensitive element, and
f. a second light-sensitive element adapted to make said electrical circuitry operable when said source of light is generating beams of light to a predetermined degree.

2. A switch as recited in claim 1, wherein the source of light is adjustably mounted within the housing.

3. A switch as recited in claim 1, wherein an access opening is provided which gives both visual access to said plate and physical access to the source of light thereby allowing removal of said light source.

* * * * *